US012621741B2

(12) United States Patent (10) Patent No.: US 12,621,741 B2
Kim et al. (45) Date of Patent: May 5, 2026

(54) DATA RELAY METHOD AND DEVICE IN COMMUNICATION SYSTEM

(71) Applicant: ELECTRONICS AND TELECOMMUNICATIONS RESEARCH INSTITUTE, Daejeon (KR)

(72) Inventors: Jun Hyeong Kim, Daejeon (KR); Il Gyu Kim, Daejeon (KR); Go San Noh, Daejeon (KR); Hee Sang Chung, Daejeon (KR); Dae Soon Cho, Daejeon (KR); Sung Woo Choi, Daejeon (KR); Seung Nam Choi, Daejeon (KR); Jung Pil Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 354 days.

(21) Appl. No.: 18/252,117

(22) PCT Filed: Nov. 5, 2021

(86) PCT No.: PCT/KR2021/016064
§ 371 (c)(1),
(2) Date: May 8, 2023

(87) PCT Pub. No.: WO2022/098167
PCT Pub. Date: May 12, 2022

(65) Prior Publication Data
US 2024/0015631 A1 Jan. 11, 2024

(30) Foreign Application Priority Data

Nov. 9, 2020 (KR) ........................ 10-2020-0148901
Nov. 3, 2021 (KR) ........................ 10-2021-0150086

(51) Int. Cl.
H04W 40/12 (2009.01)
H04B 17/318 (2015.01)
(Continued)

(52) U.S. Cl.
CPC .......... H04W 40/12 (2013.01); H04B 17/328 (2023.05); H04W 40/22 (2013.01); *H04W 92/20* (2013.01)

(58) Field of Classification Search
CPC ..... H04W 40/12; H04W 40/22; H04W 92/20; H04W 84/047; H04W 92/18; H04B 17/328; H04B 7/15521; H04B 7/2606
See application file for complete search history.

(56) References Cited

U.S. PATENT DOCUMENTS 8,199,794 B2 6/2012 Bauch et al.
8,605,670 B2 12/2013 Jo et al.
(Continued)

FOREIGN PATENT DOCUMENTS

JP 4755260 B2 8/2011
KR 10-2011-0106219 A 9/2011
(Continued)

OTHER PUBLICATIONS

Hammerstrom et al. "MIMO two-Way Relay with Transmit CSI at the Relay", Jun. 2007, IEEE (Year: 2007).*
(Continued)

*Primary Examiner* — Ayaz R Sheikh
*Assistant Examiner* — Mang Boi Thawng
(74) *Attorney, Agent, or Firm* — Rabin & Berdo, P.C.

(57) ABSTRACT

Disclosed are a relay method and device in a communication system. An operation method of a first communication node comprises the steps of: transmitting a reference signal to one or more candidate R nodes; receiving first feedback information including a minimum value of a first RSRP from a
(Continued)

start
↓
transmit reference signals to candidate R nodes — S1001
↓
receive feedback information from the candidate R nodes — S1002
↓
determine a set R' of candidate R nodes satisfying $|(RSRP_{A,i}(t)+a_A(t))-(RSRP_{B,i}(t)+a_B(t))| \leq \gamma_{imb,i}$ for $t_i \leq t \leq t_i + T_m$ — S1003
↓
select an R node in R' based on the received feedback information — S1004
↓
transmit data $x_1$ to the selected R node — S1005
↓
receive data $x_1 \oplus x_2$ from the selected R node — S1006
↓
obtain data $x_2$ by an operation $(x_1 \oplus x_2) \oplus x_1$ — S1007
↓
end first candidate R node belonging to the one or more candidate R nodes; receiving second feedback information including a minimum value of a second RSRP from a second candidate R node belonging to the one or more candidate R nodes; comparing a first value based on the first feedback information with a second value based on the second feedback information; when the first value is greater than the second value, selecting the first candidate R node as an R node that is to perform a relaying operation; and communicating with a second communication node via the R node.

14 Claims, 9 Drawing Sheets

(51) Int. Cl.
_H04W 40/22_ (2009.01)
_H04W 92/20_ (2009.01)

(56) References Cited

U.S. PATENT DOCUMENTS

| | | | |
|---|---|---|---|
| 8,867,590 B2 | 10/2014 | Seo et al. | |
| 9,072,000 B2 | 6/2015 | Tavildar et al. | |
| 9,397,744 B2 | 7/2016 | Chang et al. | |
| 9,736,886 B2 | 8/2017 | Kwon et al. | |
| 10,312,992 B2 | 6/2019 | Zummo et al. | |
| 10,873,895 B2 | 12/2020 | Agiwal et al. | |
| 2009/0268790 A1* | 10/2009 | Josiam | H04B 7/15521 |
| | | | 375/211 |
| 2013/0010841 A1* | 1/2013 | Seo | H04B 7/15521 |
| | | | 375/214 |
| 2013/0301534 A1* | 11/2013 | Yuan | H04B 7/0452 |
| | | | 370/328 |

| | | | |
|---|---|---|---|
| 2016/0191134 A1* | 6/2016 | Jeon | H04B 7/15521 |
| | | | 375/267 |
| 2016/0338119 A1* | 11/2016 | Bodas | H04W 72/51 |
| 2017/0086114 A1* | 3/2017 | Jung | H04B 17/328 |
| 2018/0084478 A1* | 3/2018 | Lee | H04W 28/12 |
| 2018/0139640 A1* | 5/2018 | Chae | H04L 25/0204 |
| 2018/0287866 A1* | 10/2018 | Yoon | H04B 17/318 |
| 2022/0060967 A1* | 2/2022 | Xu | H04W 40/22 |
| 2023/0363057 A1* | 11/2023 | Ji | H04W 88/04 |

FOREIGN PATENT DOCUMENTS

| | | |
|---|---|---|
| KR | 10-1517241 B1 | 5/2015 |
| KR | 10-1547826 B1 | 8/2015 |
| KR | 10-1554976 B1 | 10/2015 |
| KR | 10-2016-0134367 A | 11/2016 |
| KR | 10-2017-0096626 A | 8/2017 |
| WO | 2016/167635 A1 | 10/2016 |
| WO | 2018/071517 A1 | 4/2018 |

OTHER PUBLICATIONS

Qualcomm Incorporated, "Support of UE-Network relays", 3GPP TSG-RAN WG1 #80BIS, R1-151400 (Year: 2015).*

Ericsson, "Measurements, Signaling, and Selection Rules for Relay Discovery", 3GPP TSG RAN WG1 Meeting #80bis, R1-151767 (Year: 2015).*

Petar Popovski et al., "Physical Network Coding in Two-Way Wireless Relay Channels", IEEE Communications Society ICC 2007 Proceedings, pp. 707-712, 2007.

ZTE, "Discussions on Relay UE selection and discovery", R1-153414, 3GPP TSG-RAN WG1 Meeting #81, Fukuoka, Japan, May 22, 2015.

* cited by examiner

120 memory

| ROM | RAM |

110 processor

140 input interface device

150 output interface device

170

160 storage device

130 transceiver

FIG. 2

| IP |
| PDCP |
| RLC |
| MAC |
| PHY |

UE

| PHY |

RN

| IP |
| PDCP |
| RLC |
| MAC |
| PHY | eNB

L1 relay

| IP |
| PDCP |
| RLC |
| MAC |
| PHY |

UE

| RLC |
| MAC |
| PHY |

RN

| IP |
| PDCP |
| RLC |
| MAC |
| PHY | eNB

L2 relay

| IP |
| PDCP |
| RLC |
| MAC |
| PHY |

UE

| IP |
| PDCP |
| RLC |
| MAC |
| PHY |

RN

| IP |
| PDCP |
| RLC |
| MAC |
| PHY | eNB

L3 relay

FIG. 3

FIG. 4
(a) Orthogonal (no reuse)
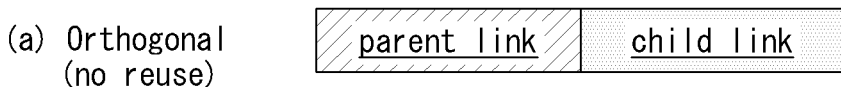
(b) Partial reuse
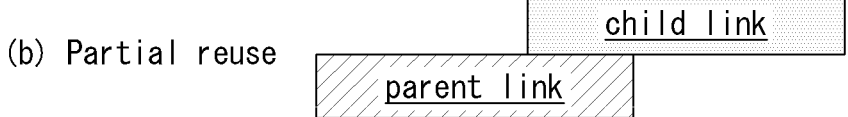
(c) Full reuse
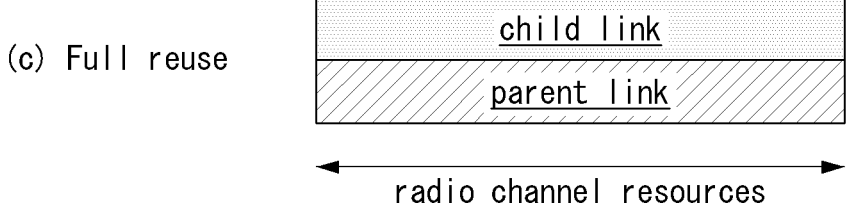
radio channel resources
FIG. 5
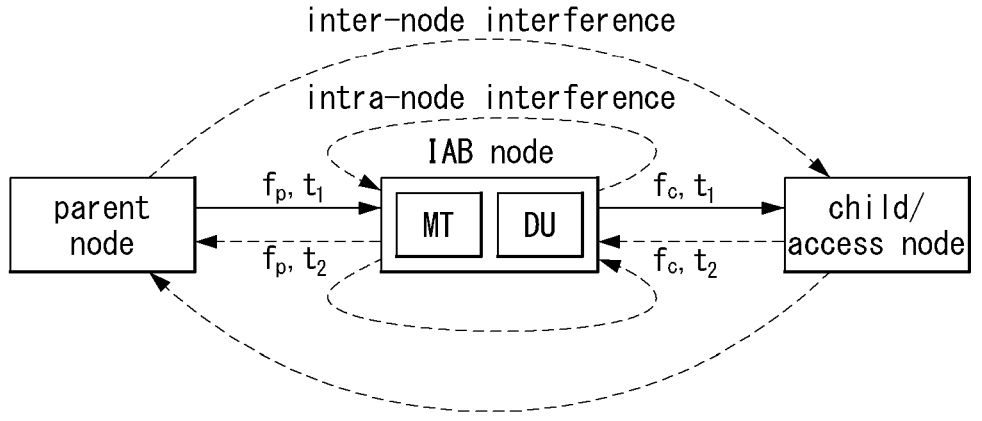

FIG. 6
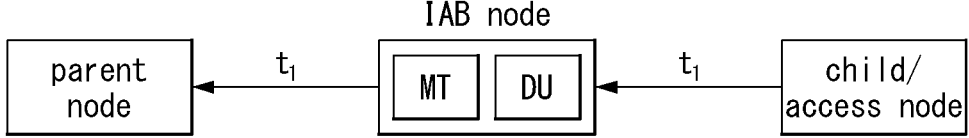
(a) non-TDM option 1 : MT-transmit / DU-transmit
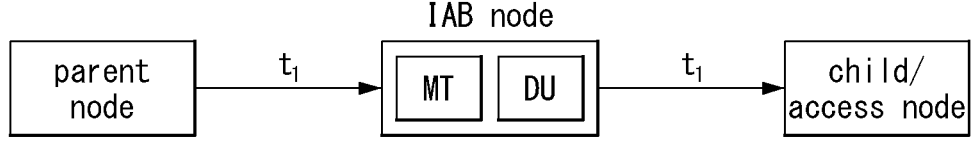
(b) non-TDM option 2 : MT-transmit / DU-receive
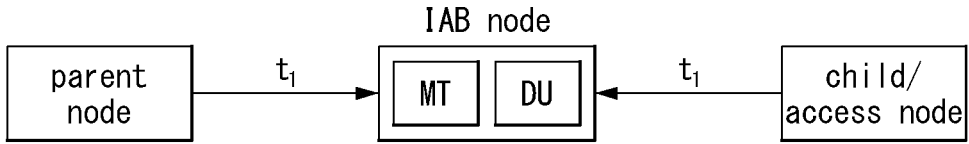
(c) non-TDM option 3 : MT-receive / DU-transmit
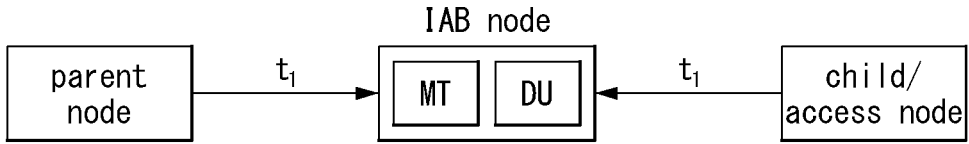
(d) non-TDM option 4 : MT-receive / DU-receive

FIG. 10 start transmit reference signals to candidate R nodes —S1001 receive feedback information from the candidate R nodes —S1002 determine a set R' of candidate R nodes satisfying
$|(RSRP_{A,i}(t)+a_A(t))-(RSRP_{B,i}(t)+a_B(t))| \leq \gamma_{imb,i}$ for $t_1 \leq t \leq t_1+T_m$ —S1003 select an R node in R' based on the
received feedback information —S1004 transmit data $x_1$ to the selected R node —S1005 receive data $x_1 \oplus x_2$ from the selected R node —S1006 obtain data $x_2$ by an operation $(x_1 \oplus x_2) \oplus x_1$ —S1007 end

FIG. 12

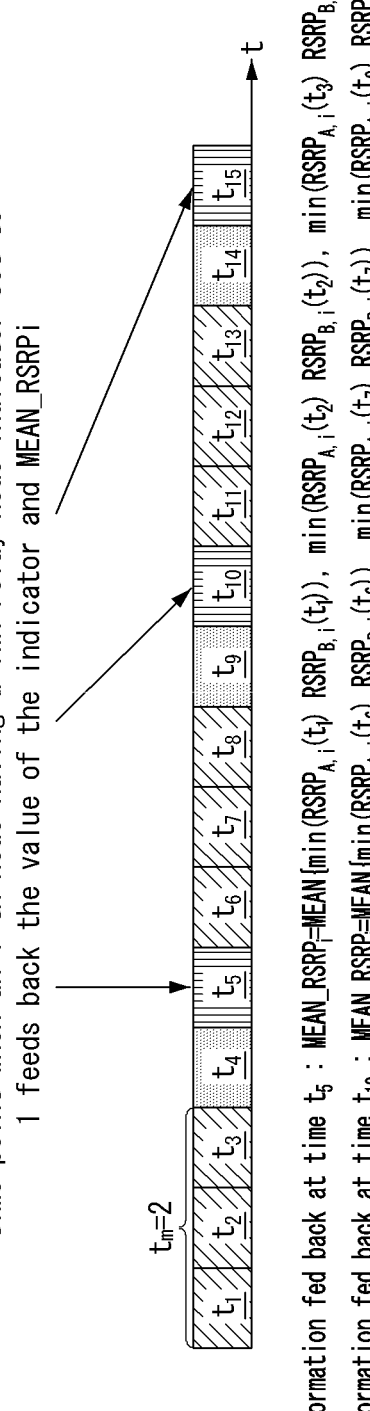

time point when an i-th node having a TWR relay node indicator set to 1 feeds back the value of the indicator and MEAN_RSRPi $t_m=2$ RSRP information fed back at time $t_5$ : $MEAN\_RSRP_i=MEAN\{min(RSRP_{A,i}(t_1), RSRP_{B,i}(t_1)), min(RSRP_{A,i}(t_2), RSRP_{B,i}(t_2)), min(RSRP_{A,i}(t_3), RSRP_{B,i}(t_3))\}$ RSRP information fed back at time $t_{10}$ : $MEAN\_RSRP_i=MEAN\{min(RSRP_{A,i}(t_6), RSRP_{B,i}(t_6)), min(RSRP_{A,i}(t_7), RSRP_{B,i}(t_7)), min(RSRP_{A,i}(t_8), RSRP_{B,i}(t_8))\}$ RSRP information fed back at time $t_{15}$ : $MEAN\_RSRP_i=MEAN\{min(RSRP_{A,i}(t_{11}), RSRP_{B,i}(t_{11})), min(RSRP_{A,i}(t_{12}), RSRP_{B,i}(t_{12})), min(RSRP_{A,i}(t_{13}), RSRP_{B,i}(t_{13}))\}$

DATA RELAY METHOD AND DEVICE IN COMMUNICATION SYSTEM

TECHNICAL FIELD

The present disclosure relates to a data relay technique, and more particularly, to selection of a relay in a two-way relay (TWR) scheme, and relay communication techniques for the same.

BACKGROUND ART

Communication may be performed based on the 5G communication technology, wireless broadband (WiBro) technology, wireless local area network (WLAN) technology, wireless personal area network (WPAN) technology, and the like. A base station may be connected to a core network through a wired backhaul (BH) or a wireless backhaul. For example, the base station may transmit data and control information received from a terminal to the core network through the wired backhaul or wireless backhaul. In addition, the base station may receive data and control information from the core network through the wired backhaul or wireless backhaul.

In particular, demand for a wireless backhauling technology that can replace optical cables at a low cost is increasing, and an integrated access and backhaul (IAB) technology is emerging for this purpose. The IAB technology is a technology that enables flexible and dense deployment of new radio (NR) cells by using nodes that support wireless backhaul links and access links in an integrated manner. In particular, it may be a solution that reduces the cost of constructing wired backhaul links for cell-to-cell communication in a high-density cell deployment environment due to reduced cell coverages while utilizing a high frequency band, and enables flexible cell deployment.

However, in a TWR communication scheme, which is one of relay communication schemes of the IAB network that utilizes a plurality of IAB nodes to provide relay-based data links, a method of selecting an optimal relay node among a plurality of relay IAB nodes may become a problem.

DISCLOSURE

Technical Problem

The present disclosure is directed to providing a method of selecting an optimal relay IAB node in an IAB network, and a relay communication method using the selected IAB node.

Technical Solution

According to a first exemplary embodiment of the present disclosure for achieving the objective, an operation method of a first communication node may comprise: transmitting a reference signal to one or more candidate relay (R) nodes; receiving first feedback information including a minimum value of a first reference signal received power (RSRP) from a first candidate R node belonging to the one or more candidate R nodes; receiving second feedback information including a minimum value of a second RSRP from a second candidate R node belonging to the one or more candidate R nodes; comparing a first value based on the first feedback information with a second value based on the second feedback information; selecting the first candidate R node as an R node to perform a relay operation when the first value is greater than the second value; and communicating with the second communication node through the R node.

The first value may mean an average value for a time t, and the time t may mean a time from when the reference signal is transmitted to when the first feedback information and the second feedback information are received.

The second value may mean an average value for a time t, and the time t may mean a time from when the reference signal is transmitted to when the first feedback information and the second feedback information are received.

The first candidate R node may satisfy a condition that a first power value is equal to or less than a second power value, the first power value may mean a transmit power difference between the first communication node and the second communication node, and the second power value may mean a maximum received power difference in which a signal distortion does not occur due to a power imbalance between signals received by the first candidate R node from the first communication node and the second communication node.

The second candidate R node may satisfy a condition that a third power value is equal to or less than a fourth power value, the third power value may mean a transmit power difference between the first communication node and the second communication node, and the fourth power value may mean a maximum received power difference in which a signal distortion does not occur due to a power imbalance between signals received by the second candidate R node from the first communication node and the second communication node.

The operation method may further comprise: transmitting first data to the R node; receiving second data from the R node; and performing an exclusive-OR (XOR) operation on the first data and the second data, wherein the first data is data transmitted to the second communication node, and the second data is a result of an XOR operation on the first data and third data transmitted from the second communication node.

According to a second exemplary embodiment of the present disclosure for achieving the objective, an operation method of a relay (R) node may comprise: receiving a reference signal from a first communication node; transmitting first feedback information for the reference signal to the first communication node; receiving first data from the first communication node; receiving third data from a second communication node; performing an XOR operation on the first data and the third data; and transmitting second data resulting from the XOR operation to the first communication node and the second communication node.

The R node may be one candidate R node selected based on the first feedback information among one or more candidate R nodes receiving the reference signal from the first communication node.

The first feedback information may include a first value, the first value may mean an average value for a time t of a minimum value of first reference signal received power (RSRP), and the time t may mean a time from when the reference signal is received to when the first feedback information is transmitted.

In the transmitting of the second data, a power of a signal transmitted to the first communication node and a power of a signal transmitted to the second communication node may be allocated equally.

According to a third exemplary embodiment of the present disclosure for achieving the objective, a first communication may comprise: a processor; a memory electronically communicating with the processor; and instructions stored in the memory, wherein when executed by the processor, the instructions cause the first communication node to: transmit a reference signal to one or more candidate relay (R) nodes; receive first feedback information including a minimum value of a first reference signal received power (RSRP) from a first candidate R node belonging to the one or more candidate R nodes; receive second feedback information including a minimum value of a second RSRP from a second candidate R node belonging to the one or more candidate R nodes; compare a first value based on the first feedback information with a second value based on the second feedback information; select the first candidate R node as an R node to perform a relay operation when the first value is greater than the second value; and communicate with the second communication node through the R node.

The first value may mean an average value for a time t, and the time t may mean a time from when the reference signal is transmitted to when the first feedback information and the second feedback information are received.

The second value may mean an average value for a time t, and the time t may mean a time from when the reference signal is transmitted to when the first feedback information and the second feedback information are received.

The first candidate R node may satisfy a condition that a first power value is equal to or less than a second power value, the first power value may mean a transmit power difference between the first communication node and the second communication node, and the second power value may mean a maximum received power difference in which a signal distortion does not occur due to a power imbalance between signals received by the first candidate R node from the first communication node and the second communication node.

The second candidate R node may satisfy a condition that a third power value is equal to or less than a fourth power value, the third power value may mean a transmit power difference between the first communication node and the second communication node, and the fourth power value may mean a maximum received power difference in which a signal distortion does not occur due to a power imbalance between signals received by the second candidate R node from the first communication node and the second communication node.

In the communicating with the second communication node, the instructions may further cause the first communication node to: transmit first data to the R node; receive second data from the R node; and perform an exclusive-OR (XOR) operation on the first data and the second data, wherein the first data is data transmitted to the second communication node, and the second data is a result of an XOR operation on the first data and third data transmitted from the second communication node.

Advantageous Effects

According to the present disclosure, in the TWR communication scheme as a relay communication scheme based on an IAB network structure that provides relay-based data links by utilizing a plurality of IAB nodes, an efficient relay node selection method and a signaling method required for the relay node selection can be provided for the IAB network. Accordingly, the performance of the communication system can be improved by the method of selecting an efficient relay node.

DESCRIPTION OF DRAWINGS

FIG. 1 is a block diagram illustrating a first exemplary embodiment of a communication node constituting a communication system.

FIG. 2 is a conceptual diagram illustrating a relay method according to functions of protocol layers in a communication system.

FIG. 3 is a conceptual diagram illustrating a first exemplary embodiment of an integrated access and backhaul (IAB) network in a communication system.

FIG. 4 is a conceptual diagram illustrating a radio channel resource multiplexing method of an IAB node in a communication system.

FIG. 5 is a conceptual diagram illustrating interference due to a full-duplexing scheme in a communication system.

FIG. 6 is a conceptual diagram illustrating non-time division multiplexing (TDM) schemes in a communication system.

FIG. 8 is a conceptual diagram illustrating a second exemplary embodiment of a TWR communication method in a communication system.

FIG. 10 is a flowchart illustrating a first exemplary embodiment for selecting an R node in a communication system.

FIG. 12 is a conceptual diagram illustrating a second exemplary embodiment of a method for transmitting feedback information of a candidate R node in a communication system.

BEST MODE OF THE INVENTION

Figure 7:
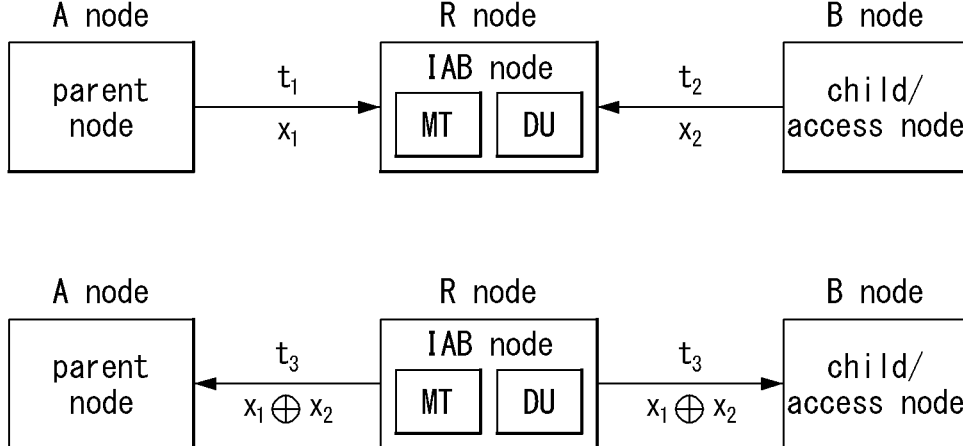
FIG. 7 is a conceptual diagram illustrating a first exemplary embodiment of a TWR communication method in a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

A wireless communication network to which exemplary embodiments according to the present disclosure are applied will be described. The wireless communication network to which the exemplary embodiments according to the present disclosure are applied is not limited to the contents described below, and the exemplary embodiments according to the present disclosure may be applied to various wireless communication networks. Here, the term 'communication system' may be used in the same sense as a 'communication network'.

FIG. 1 is a block diagram illustrating a first exemplary embodiment of a communication node constituting a communication system.

Referring to FIG. 1, a communication node 100 may comprise at least one processor 110, a memory 120, and a transceiver 130 connected to the network for performing communications. Also, the communication node 100 may further comprise an input interface device 140, an output interface device 150, a storage device 160, and the like. Each component included in the communication node 100 may communicate with each other as connected through a bus 170.

However, each of the components included in the communication node 100 may not be connected to the processor 110 not through the common bus 170 but through an individual interface or an individual bus. For example, the processor 110 may be connected to at least one of the memory 120, the transceiver 130, the input interface device 140, the output interface device 150, and the storage device 160 through a dedicated interface(s).

The processor 110 may execute a program stored in at least one of the memory 120 and the storage device 160. The processor 110 may refer to a central processing unit (CPU), a graphics processing unit (GPU), or a dedicated processor on which methods in accordance with embodiments of the present disclosure are performed. Each of the memory 120 and the storage device 160 may be constituted by at least one of a volatile storage medium and a non-volatile storage medium. For example, the memory 120 may comprise at least one of read-only memory (ROM) and random access memory (RAM).

Hereinafter, a relay communication method in a communication system will be described. A relay is a device for relaying signals between a base station and a terminal or between two terminals, and in general, may be used for the purpose of resolving a shadow area, extending a communication distance/cell coverage, and improving a throughput. In particular, in wireless relay communication, a backhaul link that is a link between a base station and a relay, and an access link that is a link between a relay and a terminal may be established as wireless links. Therefore, since the wireless relay communication method does not require an expensive wired burial cost, it is possible to expand a service area of the network at a low cost and to expand a throughput for a specific area.

FIG. 2 is a conceptual diagram illustrating a relay method according to functions of protocol layers in a communication system.

Referring to FIG. 2, a relay implementation scheme may be classified into L0/L1, L2, and L3 relays according to functions of protocol layers. The L0/L1 relay may be referred to as a repeater, and may be an amplify-and-forward (AF) relay that simply amplifies and retransmits a received signal. The difference between the L0 relay and the L1 relay is that unlike the L0 relay, the L1 relay may have a power control function or a time/frequency selective retransmission function. The L2 relay may be a decode-and-forward (DF) relay that decodes a received signal, performs error correction on the received signal, and then re-encodes and retransmits the received signal. The L3 relay may be a relay that includes most of functions supported by a base station.

Figure 3:
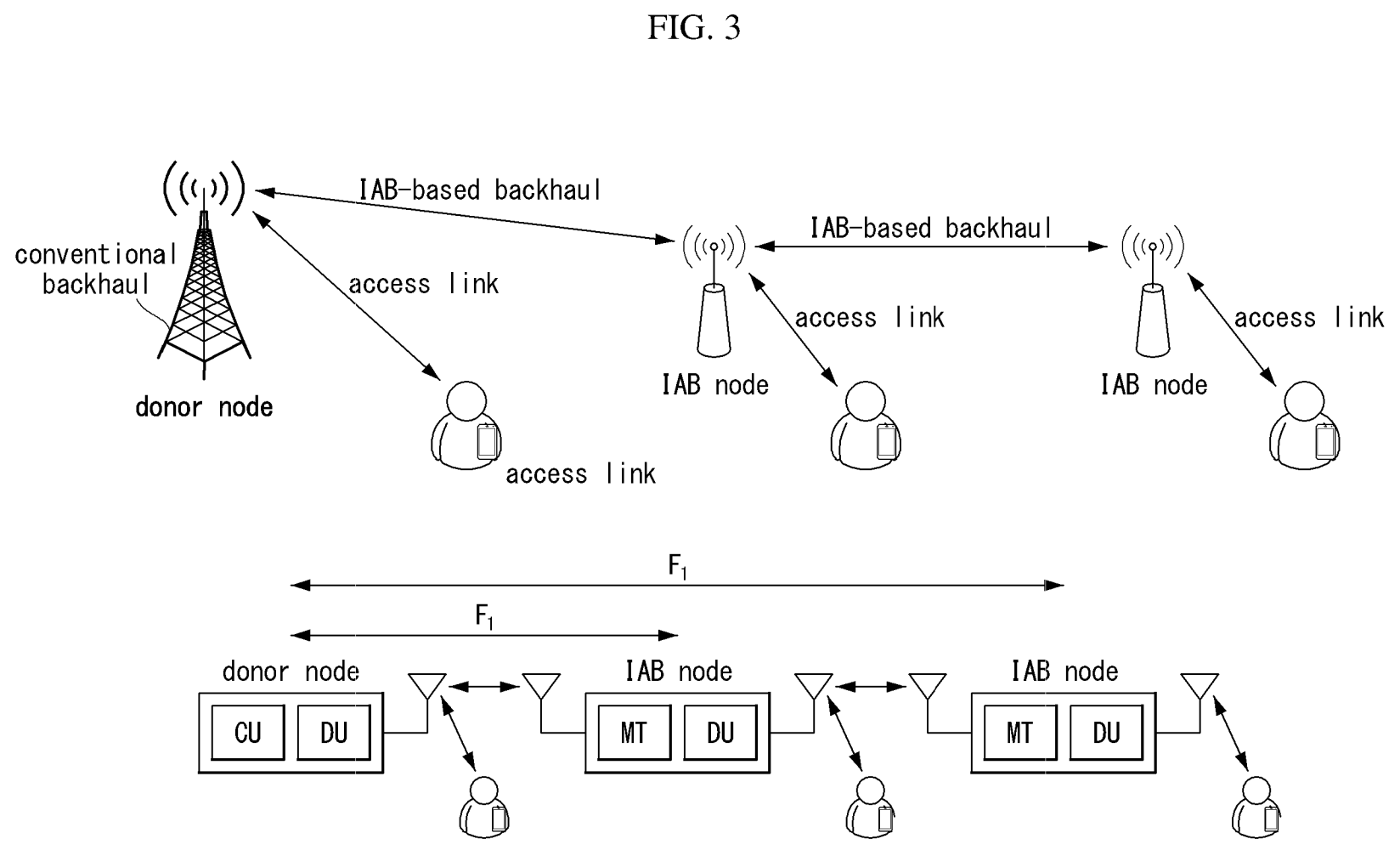

FIG. 3 is a conceptual diagram illustrating a first exemplary embodiment of an integrated access and backhaul (IAB) network in a communication system.

Referring to FIG. 3, an IAB node supporting wireless connections with a base station and a terminal through a multi-hop relay-based wireless backhaul and access integrated link may be a node that supports a wireless backhaul link and an access link.

The IAB network may include a core network (e.g., 5GC), a gNB, a donor node, and a plurality of IAB nodes. The donor node connected to the core network through a wired backhaul may be in charge of central controls such as overall route configuration, handover, routing configuration, and radio bearer mapping. The donor node may act as a base station for the IAB node, and may be configured with a donor distributed unit (DU) responsible for functions of data transmission/reception for the IAB node and a donor central unit (CU) performing controls on the IAB network and functions as an anchor of the data transmission/reception. The donor node may be connected to the IAB nodes through F1 protocols.

The IAB node may perform a relay role. The IAB node may use the same initial access mechanism as a general terminal when initially accessing the network. When the IAB node is connected to the core network, the donor node may configure information necessary for the IAB node. The IAB node may be divided into a DU performing a base station function (e.g., generation of a cell to which user equipments (UEs) and other IAB nodes can be connected) and a mobile terminal (MT) performing a UE function. The DU of the IAB node may provide a base station function to a child node and a UE, and the MT of the IAB node may provide a terminal function to a parent node and the donor DU. The IAB network may support multi-hop wireless backhauling in which additional IAB node(s) are connected to the network through a cell formed by an IAB node.

FIG. 4 is a conceptual diagram illustrating a radio channel resource multiplexing method of an IAB node in a communication system.

Referring to FIG. 4, both an 'In-Band' scheme in which a wireless backhaul link of the IAB network uses the same frequency band as an original signal and an 'Out-Band' scheme in which the wireless backhaul link of the IAB network uses a frequency band different from the original signal may be supported. That is, a radio channel resource (e.g., time, frequency, or space) multiplexing scheme between a parent link and a child link of the IAB node may be supported.

An orthogonal scheme uses non-overlapping radio channel resources, and in the orthogonal scheme, a parent link and a child link may not reuse radio channel resources. In a partial reuse scheme, radio channel resources of a parent link and a child link may partially overlap. In a full reuse scheme, all radio channel resources of a parent link and a child link may be fully overlapped.

FIG. 5 is a conceptual diagram illustrating interference due to a full-duplexing scheme in a communication system.

Referring to FIG. 5, when the IAB network operates in the partial reuse scheme or the full reuse scheme corresponding to the in-band scheme, multiplexing restrictions and interference problems between the access link and the backhaul link may occur.

In an exemplary embodiment, when a full-duplex communication scheme (e.g., MT-receive/DU-transmit or MT-transmit/DU-receive) is applied in the in-band scheme, intra-node interference and inter-node interference may occur in the IAB network. The inter-node interference is similar to a general multiple-input and multiple-output (MIMO) environment, so interference management may be relatively easy. However, in the case of intra-node interference, a node may receive a signal transmitted by the node itself, and a strength of the received signal may be much greater than a strength of a signal desired to be received from another node. Therefore, since the strength of the signal received from itself far exceeds an acceptable range of automatic gain control (AGC), it may be difficult to demodulate a signal received from another node.

In another exemplary embodiment, the IAB node may simultaneously operate in an MT-transmit/DU-transmit scheme. Alternatively, the IAB node may simultaneously operate in an MT-receive/DU-receive scheme. However, when the IAB node performs downlink (DL) and uplink (UL) communications using the same radio channel resources (e.g., frequency and space), a cross-link interference (CLI) may occur.

FIG. 6 is a conceptual diagram illustrating non-time division multiplexing (TDM) schemes in a communication system.

Referring to FIG. 6, the non-TDM resource multiplexing schemes of the IAB node currently under discussion, that is, the simultaneous operation schemes, may be classified into four types such as the MT-transmit/DU-transmit scheme, MT-transmit/DU-receive scheme, MT-receive/DU-transmit scheme, and MT-receive/DU-receive scheme.

Here, the MT-transmit/DU-transmit scheme (a) and the MT-receive/DU-receive scheme (d) may correspond to a two-way relay (TWR) channel communication method, which is one of relay communication schemes. In addition, in connection with the relay, the TWR communication scheme may be applied to sidelink-based UE-to-UE relaying and UE-to-network relaying. Therefore, in the TWR communication method, a method of selecting an optimal relay among a plurality of relay nodes and a relay communication method therefor may be required.

[TWR Communication Method in IAB Network]

FIG. 7 is a conceptual diagram illustrating a first exemplary embodiment of a TWR communication method in a communication system.

Referring to FIG. 7, in the TWR communication method in the IAB network, an A node and a B node may exchange data through relay communication of an R node located between the two nodes. The R node may be one of an IAB node, a vehicle to everything (V2X) terminal, or a device-to-device (D2D) terminal capable of operating as a relay.

For example, when the A node transmits data $x_1$ to the B node and the B node transmits data $x_2$ to the A node, four time slots (e.g., $t_1$ to $t_4$) may be required. When the R node transmits the data $x_1$ to the B node and transmits the data $x_2$ to the A node, the R node may use the same frequency band, and may improve spectral efficiency by transmitting them in the same time slot. However, performance degradation may occur due to interference.

The TWR communication method may be applied to various relay communication environments including an IAB network and sidelink communications. In case of an IAB network, the A node may be a parent node. The B node may be a child node or an access node. The R node may be an IAB node. In case of sidelink communications, the A node may be one terminal (e.g., V2X or D2D terminal) among terminals exchanging data with the B node. The B node may be one terminal (e.g., V2X or D2D terminal) among terminals exchanging data with the A node. The R node may be one terminal (e.g., V2X or D2D terminal) among terminals exchanging data with the A node. The R node may be one terminal (e.g., V2X or D2D terminal) among terminals exchanging data with the B node.

[Improved TWR Communication Method in IAB Network]

FIG. 8 is a conceptual diagram illustrating a second exemplary embodiment of a TWR communication method in a communication system.

Referring to FIG. 8, in order to improve spectral efficiency in the TWC communication method, network coding (NC) may be applied to data transmission of the R node. The NC may be referred to as a physical NC (PNC). The R node may perform an exclusive-OR (XOR) operation on the data $x_1$ received from the A node and the data $x_2$ received from the B node. The R node may generate data $x_1 \oplus x_2$ through the XOR operation, and may transmit the generated data $x_1 \oplus x_2$ to the A node and the B node. Here, the R node may transmit the data $x_1 \oplus x_2$ to the A node and the B node in one time slot (e.g., $t_3$). The A node may receive the data $x_1 \oplus x_2$ from the R node, and a method for the A node to decode the data $x_2$ transmitted by the B node may be expressed as Equation 1 below.

$$(x_2 \oplus x_2) \oplus x_1 = x_2 \qquad \text{[Equation 1]}$$

In Equation 1, the A node may perform an XOR operation on the data $x_1 \oplus x_2$ received from the R node and the data $x_1$ transmitted by the A node to the R node. Accordingly, the A node may obtain the data $x_2$ transmitted by the B node through Equation 1 above.

The B node may receive data $x_1 \oplus x_2$ from the R node, and a method for the B node to decode the data $x_1$ transmitted by the A node may be expressed as in Equation 2 below. The B node may receive the data $x_1 \oplus x_2$ from the R node, and a method for the B node to decode the data $x_1$ transmitted by the A node may be expressed as Equation 2 below.

$$(x_1 \oplus x_2) \oplus x_2 = x_1 \qquad \text{[Equation 2]}$$

The B node may perform an XOR operation on the data $x_1 \oplus x_2$ received from the R node and the data $x_2$ transmitted by the B node to the R node. Accordingly, the B node may obtain the data $x_1$ transmitted by the A node through Equation 2 above.

Even in a case of the TWR communication to which NC is not applied, the R node may transmit the data $x_1$ and the data $x_2$ in one time slot. However, unlike the TWR communication to which NC is applied, the following problems may occur. First, in the NC-based TWR communication, the R node may allocate a power $P_t$ for transmission of the data $x_1 \oplus x_2$. However, in the TWR communication to which NC is not applied, there may be a problem in that the R node should divide and allocate the power $P_t$ for transmission of the data $x_1$ and the data $x_2$.

Second, in the NC-based TWR communication, the A node and the B node may receive the same signal (e.g., data $x_1 \oplus x_2$) from the R node. However, in the TWR communication to which NC is not applied, the signal (e.g., data $x_2$) received by the A node from the R node and the signal (e.g., data $x_1$) received by the B node from the R node may be different from each other. Therefore, the A node and the B node may interfere with each other, and there may be a performance decrease due to this.

That is, the signal (e.g., data $x_2$) transmitted by the R node to the A node may act as interference to the B node, and the signal (e.g., data $x_1$) transmitted by the R node to the B node may act as interference to the A node. However, if the A node and the B node are capable of estimating an interference channel, the interference signal may be canceled by using an interference cancellation method. However, even in this case, there may be a problem in that the implementation complexity of the receiving ends increases.

Therefore, in consideration of the above-described problems, the NC-based TWR communication method may be advantageous. However, it may be important to select an appropriate R node to improve the TWR communication performance, and a method for selecting an appropriate R node will be described below.

[R Node Selection Method in TWR Communication Scheme]

Figure 9:
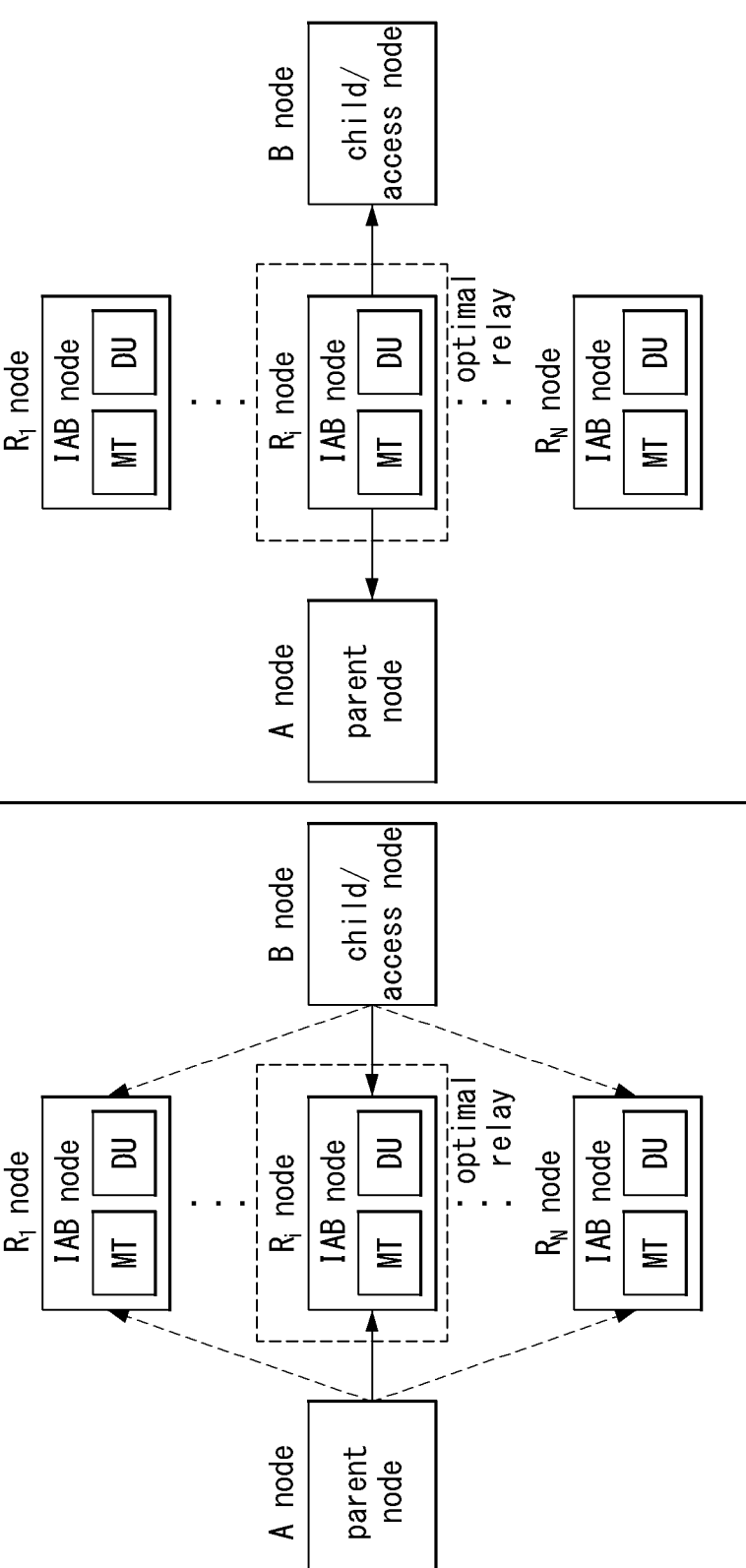
FIG. 9 is a conceptual diagram illustrating a first exemplary embodiment for selecting an R node in a communication system.

FIG. 9 is a conceptual diagram illustrating a first exemplary embodiment for selecting an R node in a communication system.

Referring to FIG. 9, in the IAB network, the most suitable R node may be selected from among a plurality of candidate R nodes (e.g., $R_1$ to $R_N$ nodes) located between the A node and the B node in order to improve the TWR communication performance. Referring again to FIG. 7, the R node may receive data from the A node and the B node in the same time slot. However, an imbalance between a strength of a signal (e.g., data $x_1$) received by the R node from the A node and a strength of a signal (e.g., data $x_2$) received by the R node from the B node may be a problem. Since a DU of an IAB node can operate a higher transmit power than a MT of the IAB node, a strength of a downlink signal received from a DU of a parent node may be higher than a strength of an uplink signal received from a MT of a child/access node. In this case, if the power difference between the two signals increases, the signal may be distorted in the AGC. Accordingly, reception performance may be deteriorated.

A candidate R node that may be selected as an R node in the TWR communication method may be one of nodes in which a power imbalance between received signals does not occur. A set R' of candidate R nodes in which a power imbalance between received signals does not occur may be expressed as in Equation 3 below.

$$R'=\{i \mid |(\mathrm{RSRP}_{A,i}(t)+\alpha_A(t))-(\mathrm{RSRP}_{B,i}(t)+\alpha_B(t))| \le \gamma_{imb,i}$$
$$\text{for } t_1 \le t \le t_1+T_m\} \qquad [\text{Equation 3}]$$

In Equation 3, if the i-th R node (e.g., i-th IAB node) satisfies the condition $(|(\mathrm{RSRP}_{A,i}(t)+\alpha_A(t))-(\mathrm{RSRP}_{B,i}(t)+\alpha_B$ $(t))| \le \gamma_{imb,i})$ for for $t_1 \le t \le t_1+T_m$, it may be included in the set R'. Here, $\gamma_{imb,i}$ may mean a maximum received power difference in which a signal distortion due to the power imbalance between received signals does not occur when the i-th R node simultaneously receives two signals (e.g., data $x_1$ transmitted by the A node and data $x_2$ transmitted by the B node). The reference signal received power (RSRP) may mean powers of reference signals received by the i-th R node (e.g., the i-th IAB node) from the A node and the B node, and a may mean a transmit power strength of the corresponding node. That is, in Equation 3, the set R' may include a candidate R node in which a transmit power difference between the A node and the B node is less than or equal to a maximum received power difference in which a signal distortion due to a power imbalance between the received signals does not occur. At a time t, $\alpha_A(t)$ and $\alpha_B(t)$ may satisfy conditions of Equation 4 below.

$$-P_{tx,A}(t)<\alpha_A(t)\le PH_A(t)$$

$$-P_{tx,B}(t)<\alpha_B(t)\le PH_B(t) \qquad [\text{Equation 4}]$$

In Equation 4, $P_{tx,A}(t)$ may be a transmit power of the A node at the time t, and $PH_A(t)$ may be a power headroom (PH) of the A node at the time t. Management on the set R' in the TWR communication may be performed by a node leading the TWR communication. In the case of the IAB network, a parent node may manage the set R'. In the case of sidelink communications, any one of the A node and the B node may perform management on the set R'. In an in-coverage environment, any one of the A node, the B node, or the base station may perform management on the set R'.

Figure 10:
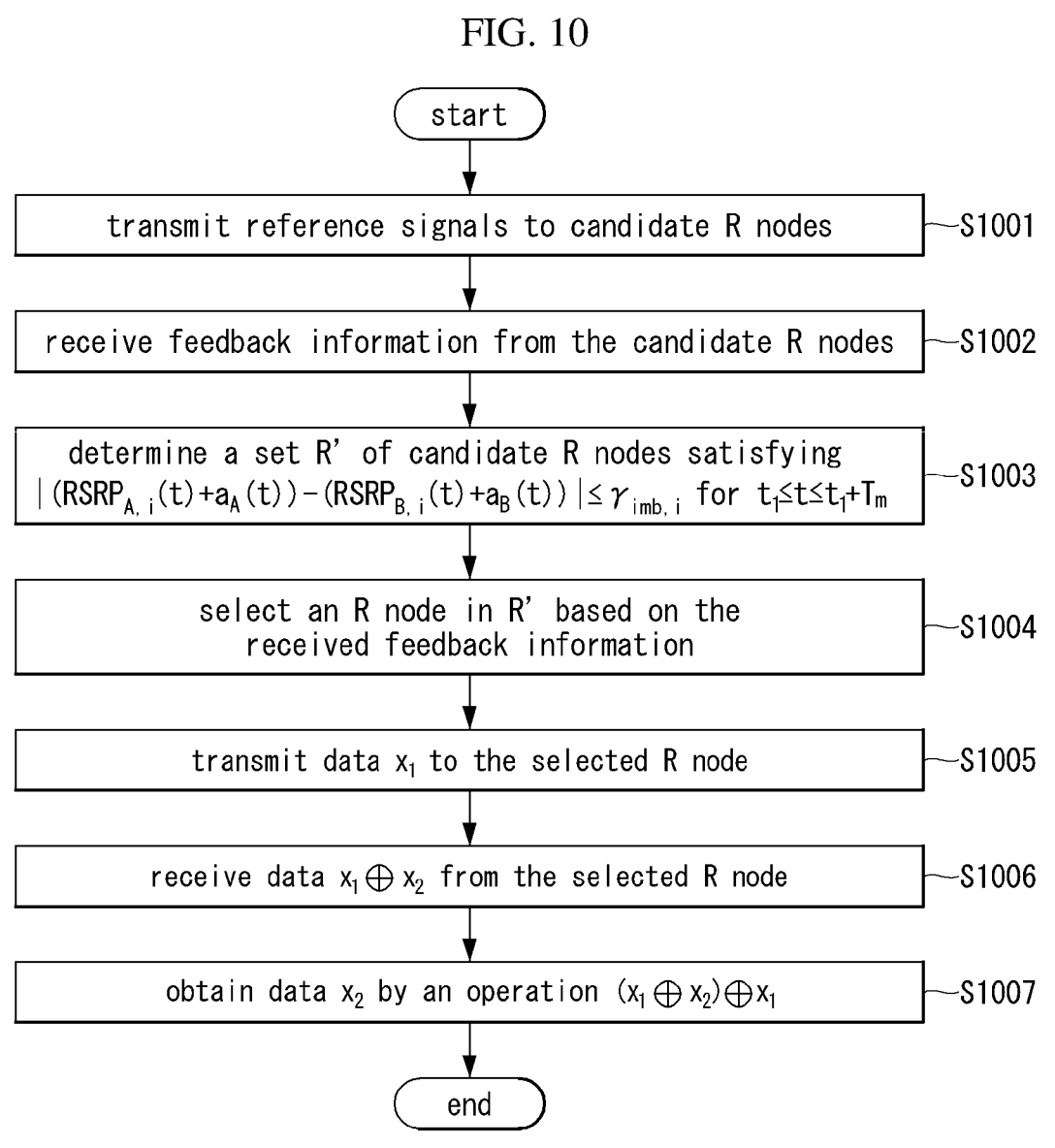

FIG. 10 is a flowchart illustrating a first exemplary embodiment for selecting an R node in a communication system.

Referring to FIG. 10, the A node may transmit a reference signal (RS) to candidate R nodes (S1001). The candidate R nodes may receive the reference signal from the A node. Each candidate R node receiving the reference signal may transmit feedback information to the A node. The A node may receive the feedback information from each candidate R node, and the feedback information received by the A node may include one or more of information elements in Table 1 below (S1002).

TABLE 1

| | Information element (IE) |
| --- | --- |
| Feedback information that the candidate R nodes transmit to the A node | $PH_B(t)$ $P_{tx, B}(t)$ RSRP $\gamma_{imb, i}$ |

Figure 11:
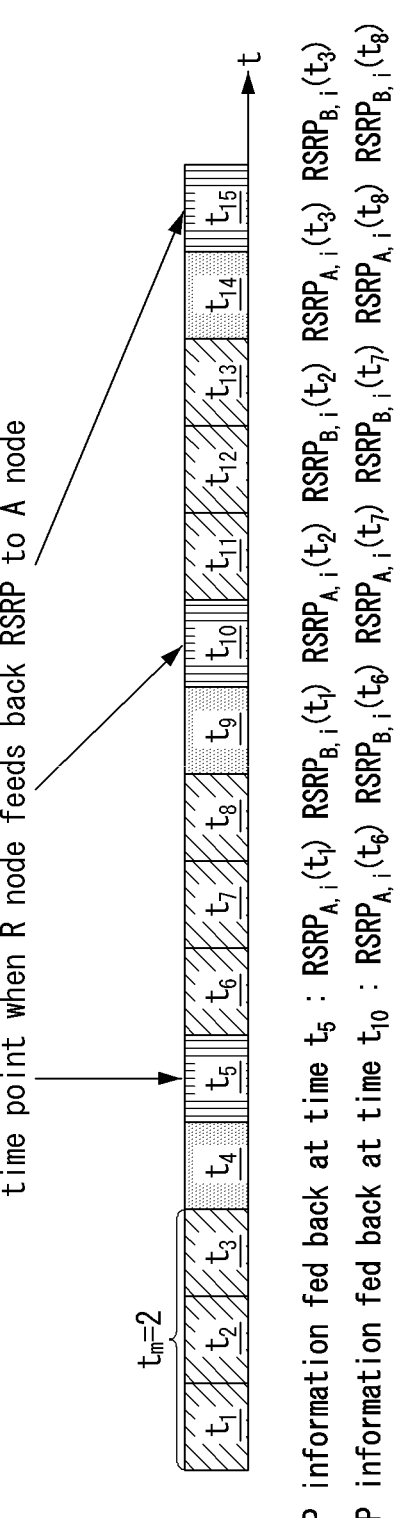
FIG. 11 is a conceptual diagram illustrating a first exemplary embodiment of a method for transmitting feedback information of a candidate R node in a communication system.

FIG. 11 is a conceptual diagram illustrating a first exemplary embodiment of a method for transmitting feedback information of a candidate R node in a communication system.

Referring to FIG. 11, a candidate R node (e.g., i-th candidate R node) may measure RSRPs at times $t_1$, $t_2$, and $t_3$ (i.e., when $T_m=2$), and may feedback the measurement results, $\mathrm{RSRP}_{A,i}(t_1)$, $\mathrm{RSRP}_{B,i}(t_1)$, $\mathrm{RSRP}_{A,i}(t_2)$, $\mathrm{RSRP}_{B,i}(t_2)$, $\mathrm{RSRP}_{A,i}(t_3)$, and $\mathrm{RSRP}_{B,i}(t_3)$ to the A node at a time $t_5$. All the candidate R nodes may measure RSRPs and feedback the measurement results to the A node.

However, it may not be necessary for all the candidate R nodes to transmit $PH_B(t)$ and $P_{tx,B}(t)$ to the A node. In order to reduce signaling overhead, the A node may designate a candidate R node to which the B node feeds back $PH_B(t)$ and

11

$P_{rx,B}(t)$ of the B node. The B node may transmit $PH_B(t)$ and $P_{rx,B}(t)$ to the designated candidate R node. The designated candidate R node may receive $PH_B(t)$ and $P_{rx,B}(t)$ from the B node, and may transmit the received $PH_B(t)$ and $P_{rx,B}(t)$ to the A node. The A node may periodically re-designate a candidate R node that will feed back the $PH_B(t)$ and $P_{rx,B}(t)$ of the B node.

The A node may determine the set R' that satisfies the above-mentioned conditions of Equation 3 through information included in the feedback information (S1003). The A node may select a candidate R node that most satisfies Equation 5 below for $t_1 \leq t \leq t_1 + T_m$ among candidate R nodes included in the set R' as a relay node (i.e., R node) in the NC-based TWR communication. That is, the A node may select a candidate R node having the largest value among the minimum values of a sum of the RSRP and power headroom in the set R' as the R node (S1004).

$$i^*(t) = \underset{i \in R'}{\operatorname{argmax}} \min(RSRP_{A,i}(t) + PH_A(t), RSRP_{B,i}(t) + PH_B(t)) \quad \text{[Equation 5]}$$

The A node may transmit/receive data to/from the B node through the R node selected according to Equation 5 by using the above-described TWR communication methods. That is, the A node may transmit data $x_1$ to the R node (S1005). The R node may receive the data $x_1$ from the A node. The R node may perform an XOR operation on the data $x_1$ received from the A node and the data $x_2$ received from the B node. The R node may transmit data $x_1 \oplus x_2$ that is a result of the operation to the A node and the B node at the same time. The A node and the B node may simultaneously receive the data $x_1 \oplus x_2$ from the R node (S1006). The A node may obtain data $x_2$ that the B node intends to transmit to the A node through the R node through the XOR operation (i.e., Equation 1) on the received data $x_1 \oplus x_2$ and the data $x_1$ (S1007).

[Improved R Node Selection Method in TWR Communication Scheme]

FIG. 12 is a conceptual diagram illustrating a second exemplary embodiment of a method for transmitting feedback information of a candidate R node in a communication system.

Referring to FIG. 12, in order for the A node to select an R node according to Equation 5, a significant amount of signaling overhead may occur due to feedback of RSRP values to be received from the candidate R nodes. Therefore, the A node may configure each of all the candidate R nodes to feed back the measured RSRP value by using a TWR relay node indicator.

For example, the A node may configure each candidate R node to periodically transmit a 1-bit TWR relay node indicator set to 1 when Equation 4 is satisfied and transmit a 1-bit TWR relay node indicator set to 0 when Equation 4 is not satisfied. Accordingly, the A node may reduce signaling overhead by receiving the 1-bit TWR relay node indicator. However, since the A node cannot select an R node without knowing the RSRP values of the respective candidate R nodes, the A node may configure a candidate R node (e.g., i-th candidate R node) having a TWR relay node indicator set as 1 to feed back $MEAN\_RSRP_i$, which is the average value of the minimum RSRP values for $t_1 \leq t \leq t_1 + T_m$, to the A node together with the TWR relay node indicator.

$$MEAN\_RSRP_i = E_t\{\min(RSRP_{A,i}(t), RSRP_{B,i}(t)\} \text{ for } t_1 \leq t \leq t_1 + T_m \quad \text{[Equation 6]}$$

12

The A node may select a candidate R node that most satisfies Equation 7 below from among a set R'' of the candidate R nodes for which the TWR relay node indicator is indicated as 1 as the relay node (i.e., R node) of the NC-based TWR communication. That is, the A node may select the candidate R node having the largest $MEAN\_RSRP$ value for $t_1 \leq t \leq t_1 + T_m$ in the set R'' as the R node.

$$i^* = \underset{i \in R''}{\operatorname{argmax}} MEAN\_RSRP_i \quad \text{[Equation 7]}$$

The A node may transmit/receive data to/from the B node through the R node selected according to Equation 7 by using the above-described TWR communication methods.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a first communication node in a communication system, the operation method comprising:
transmitting a reference signal to one or more candidate relay (R) nodes;
receiving first feedback information including a minimum value of a first reference signal received power (RSRP) from a first candidate R node belonging to the one or more candidate R nodes;
receiving second feedback information including a minimum value of a second RSRP from a second candidate R node belonging to the one or more candidate R nodes;
comparing a first value based on the first feedback information with a second value based on the second feedback information;
selecting the first candidate R node as an R node to perform a relay operation when the first value is greater than the second value; and
communicating with a second communication node through the R node,
wherein the first candidate R node satisfies a condition that a first power value is equal to or less than a second power value, the first power value means a transmit power difference between the first communication node and the second communication node, and the second power value means a maximum received power difference in which a signal distortion does not occur due to a power imbalance between signals received by the first candidate R node from the first communication node and the second communication node.

2. The operation method according to claim 1, wherein the first value means an average value for a time t, and the time t means a time from when the reference signal is transmitted to when the first feedback information and the second feedback information are received.

3. The operation method according to claim 1, wherein the second value means an average value for a time t, and the time t means a time from when the reference signal is transmitted to when the first feedback information and the second feedback information are received.

4. The operation method according to claim 1, wherein the second candidate R node satisfies a condition that a third power value is equal to or less than a fourth power value, the third power value means a transmit power difference between the first communication node and the second communication node, and the fourth power value means a maximum received power difference in which a signal distortion does not occur due to a power imbalance between signals received by the second candidate R node from the first communication node and the second communication node.

5. The operation method according to claim 1, further comprising:

transmitting first data to the R node;
receiving second data from the R node; and
performing an exclusive-OR (XOR) operation on the first data and the second data,
wherein the first data is data transmitted to the second communication node, and the second data is a result of an XOR operation on the first data and third data transmitted from the second communication node.

6. An operation method of a relay (R) node in a communication system, the operation method comprising:

receiving a reference signal from a first communication node;
transmitting first feedback information for the reference signal to the first communication node;
receiving first data from the first communication node;
receiving third data from a second communication node;
performing an XOR operation on the first data and the third data; and
transmitting second data resulting from the XOR operation to the first communication node and the second communication node,
wherein the R node is a candidate R node satisfying a condition that a first power value is equal to or less than a second power value, the first power value means a transmit power difference between the first communication node and the second communication node, and the second power value means a maximum received power difference in which a signal distortion does not occur due to a power imbalance between signals received by the candidate R node from the first communication node and the second communication node.

7. The operation method according to claim 6, wherein the R node is one candidate R node selected based on the first feedback information among one or more candidate R nodes receiving the reference signal from the first communication node.

8. The operation method according to claim 6, wherein the first feedback information includes a first value, the first value means an average value for a time t of a minimum value of first reference signal received power (RSRP), and the time t means a time from when the reference signal is received to when the first feedback information is transmitted.

9. The operation method according to claim 6, wherein in the transmitting of the second data, a power of a signal transmitted to the first communication node and a power of a signal transmitted to the second communication node are allocated equally.

10. A first communication node in a communication system, the first communication node comprising:

a processor;
a memory electronically communicating with the processor; and
instructions stored in the memory,
wherein when executed by the processor, the instructions cause the first communication node to:
transmit a reference signal to one or more candidate relay (R) nodes;
receive first feedback information including a minimum value of a first reference signal received power (RSRP) from a first candidate R node belonging to the one or more candidate R nodes;
receive second feedback information including a minimum value of a second RSRP from a second candidate R node belonging to the one or more candidate R nodes;
compare a first value based on the first feedback information with a second value based on the second feedback information;
select the first candidate R node as an R node to perform a relay operation when the first value is greater than the second value; and
communicate with a second communication node through the R node,
wherein the first candidate R node satisfies a condition that a first power value is equal to or less than a second power value, the first power value means a transmit power difference between the first communication node and the second communication node, and the second power value means a maximum received power difference in which a signal distortion does not occur due to a power imbalance between signals received by the first candidate R node from the first communication node and the second communication node.

11. The first communication node according to claim 10, wherein the first value means an average value for a time t, and the time t means a time from when the reference signal is transmitted to when the first feedback information and the second feedback information are received.

12. The first communication node according to claim 10, wherein the second value means an average value for a time t, and the time t means a time from when the reference signal is transmitted to when the first feedback information and the second feedback information are received.

13. The first communication node according to claim 10, wherein the second candidate R node satisfies a condition that a third power value is equal to or less than a fourth power value, the third power value means a transmit power difference between the first communication node and the second communication node, and the fourth power value means a maximum received power difference in which a signal distortion does not occur due to a power imbalance between signals received by the second candidate R node from the first communication node and the second communication node.

14. The first communication node according to claim 10, wherein in the communicating with the second communication node, the instructions further cause the first communication node to:

transmit first data to the R node;

receive second data from the R node; and perform an exclusive-OR (XOR) operation on the first data and the second data, wherein the first data is data transmitted to the second communication node, and the second data is a result of an XOR operation on the first data and third data transmitted from the second communication node.

\* \* \* \* \*